US012128798B2

(12) United States Patent
Yun et al.

(10) Patent No.: US 12,128,798 B2
(45) Date of Patent: Oct. 29, 2024

(54) SEAT FOR VEHICLE

(71) Applicants: Hyundai Motor Company, Seoul (KR); Kia Corporation, Seoul (KR)

(72) Inventors: Jun Young Yun, Gyeonggi-do (KR); Sang Do Park, Gyeonggi-do (KR); Ho Suk Jung, Gyeonggi-do (KR); Mu Young Kim, Gyeonggi-do (KR); Jun Hwan Lee, Seoul (KR); Chan Ho Jung, Gyeonggi-do (KR); Hyeok Seung Lee, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 106 days.

(21) Appl. No.: 17/972,902

(22) Filed: Oct. 25, 2022

(65) Prior Publication Data
US 2023/0166644 A1     Jun. 1, 2023

(30) Foreign Application Priority Data
Nov. 29, 2021    (KR) .................. 10-2021-0166380

(51) Int. Cl.
     *B60N 2/30*      (2006.01)
     *B60N 2/22*      (2006.01)
     *B60N 2/68*      (2006.01)

(52) U.S. Cl.
     CPC .............. *B60N 2/3011* (2013.01); *B60N 2/22* (2013.01); *B60N 2/304* (2013.01); *B60N 2/3047* (2013.01); *B60N 2/3065* (2013.01); *B60N 2/682* (2013.01)

(58) Field of Classification Search
CPC ..... B60N 2/305; B60N 2/3047; B60N 2/3065
See application file for complete search history.

(56) References Cited

U.S. PATENT DOCUMENTS

| 7,611,200 | B2 * | 11/2009 | Jovicevic | B60N 2/305 |
| | | | | 297/14 |
| 7,758,123 | B2 * | 7/2010 | Picker | B60N 2/3011 |
| | | | | 296/65.09 |
| 8,052,215 | B2 * | 11/2011 | Ito | B60N 2/02246 |
| | | | | 297/354.12 |
| 8,434,823 | B2 * | 5/2013 | Du | B60N 2/2252 |
| | | | | 297/354.12 |
| 10,625,630 | B2 * | 4/2020 | Keyser | B60N 2/4228 |
| 11,766,957 | B2 * | 9/2023 | Naik | B60N 2/20 |
| | | | | 297/362.11 |
| 2017/0088020 | A1 * | 3/2017 | Poniatowski | B60N 2/305 |
| 2018/0015851 | A1 * | 1/2018 | Goodhall | B60N 2/3031 |
| 2022/0032828 | A1 * | 2/2022 | Epaud | B60N 2/3013 |
| 2022/0227268 | A1 * | 7/2022 | Gam | B60N 2/2209 |

FOREIGN PATENT DOCUMENTS

| DE | 102004039246 A1 * | 2/2006 | ........... B60N 2/3011 |
| DE | 102015223221 A1 * | 6/2016 | .............. B60N 2/06 |
| DE | 102015111844 A1 | 1/2017 | |

(Continued)

*Primary Examiner* — Timothy J Brindley
(74) *Attorney, Agent, or Firm* — Fox Rothschild LLP

(57) ABSTRACT

Disclosed is a seat for a vehicle configured to variously adjust a seat position between, for example, a full-flat mode, a relaxation mode, a cushion tip-up mode, a full-bed mode, a walk-in mode, and a rear-view mode using a first hinge shaft to rotate the entire seat, including a seatback and a seat cushion, and a second hinge shaft to rotate the seatback.

22 Claims, 16 Drawing Sheets

(56) References Cited

FOREIGN PATENT DOCUMENTS

| | | | |
|---|---|---|---|
| DE | 202023104382 U1 * | 9/2023 | ......... B60N 2/01583 |
| JP | 3813291 B2 | 8/2006 | |
| KR | 100318074 B1 | 12/2001 | |
| KR | 2018-0060397 A | 6/2018 | |
| KR | 101902332 B1 * | 9/2018 | |
| WO | WO-2008107100 A1 * | 9/2008 | ............. B60N 2/206 |
| WO | WO-2009142576 A1 * | 11/2009 | ........... A61G 3/0808 |
| WO | WO-2010001052 A2 * | 1/2010 | ......... B60N 2/01533 |
| WO | WO-2023073299 A1 * | 5/2023 | ......... B60N 2/02246 |

* cited by examiner

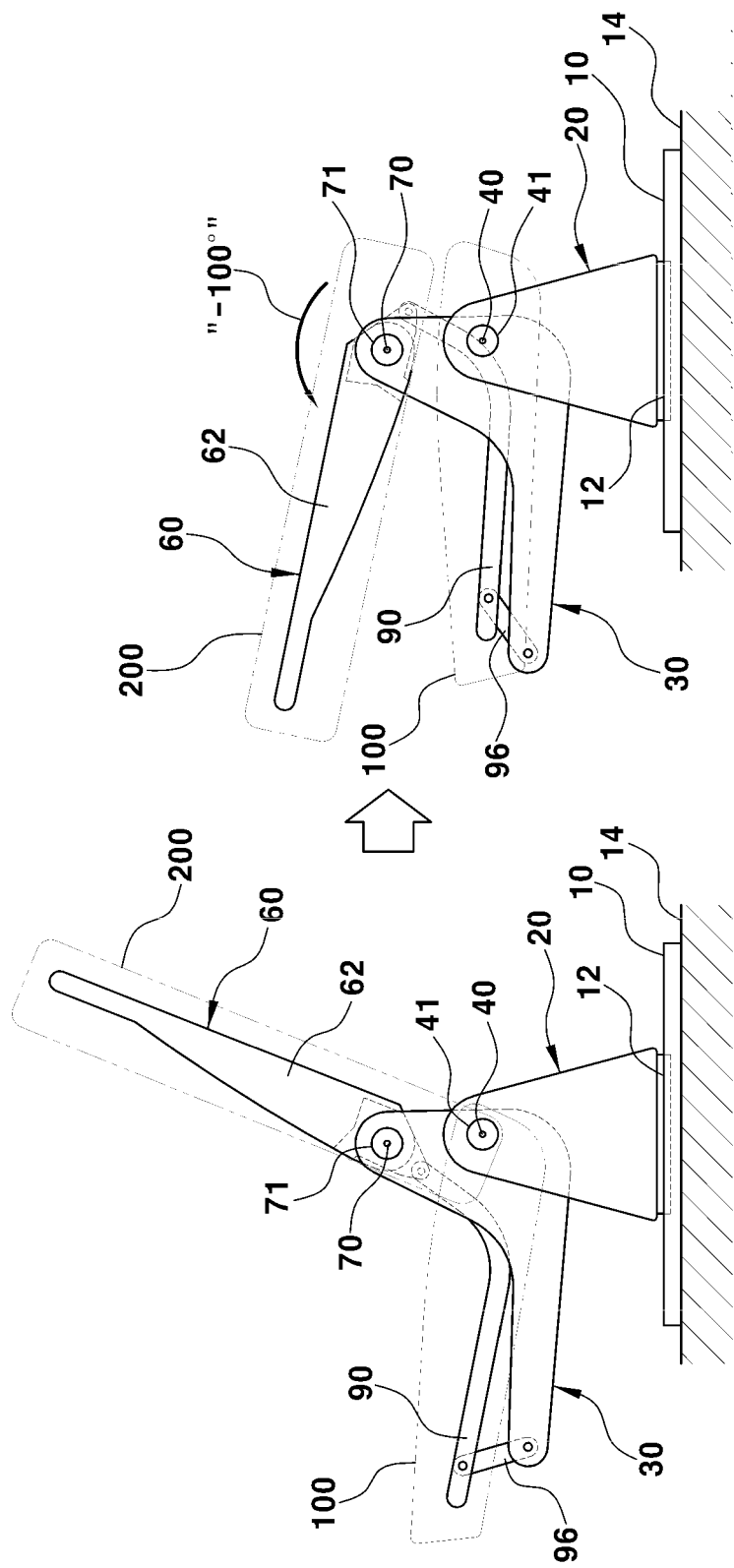

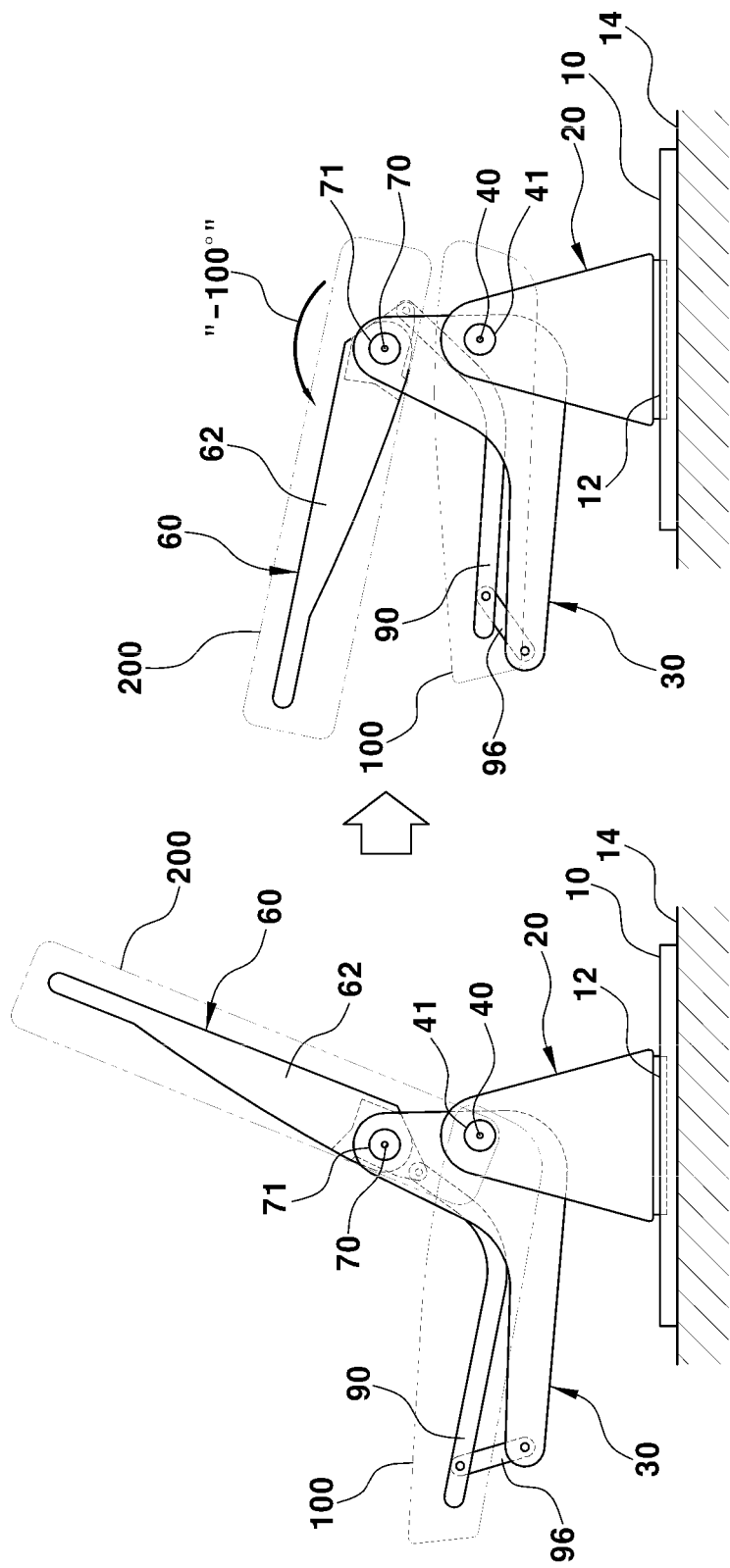

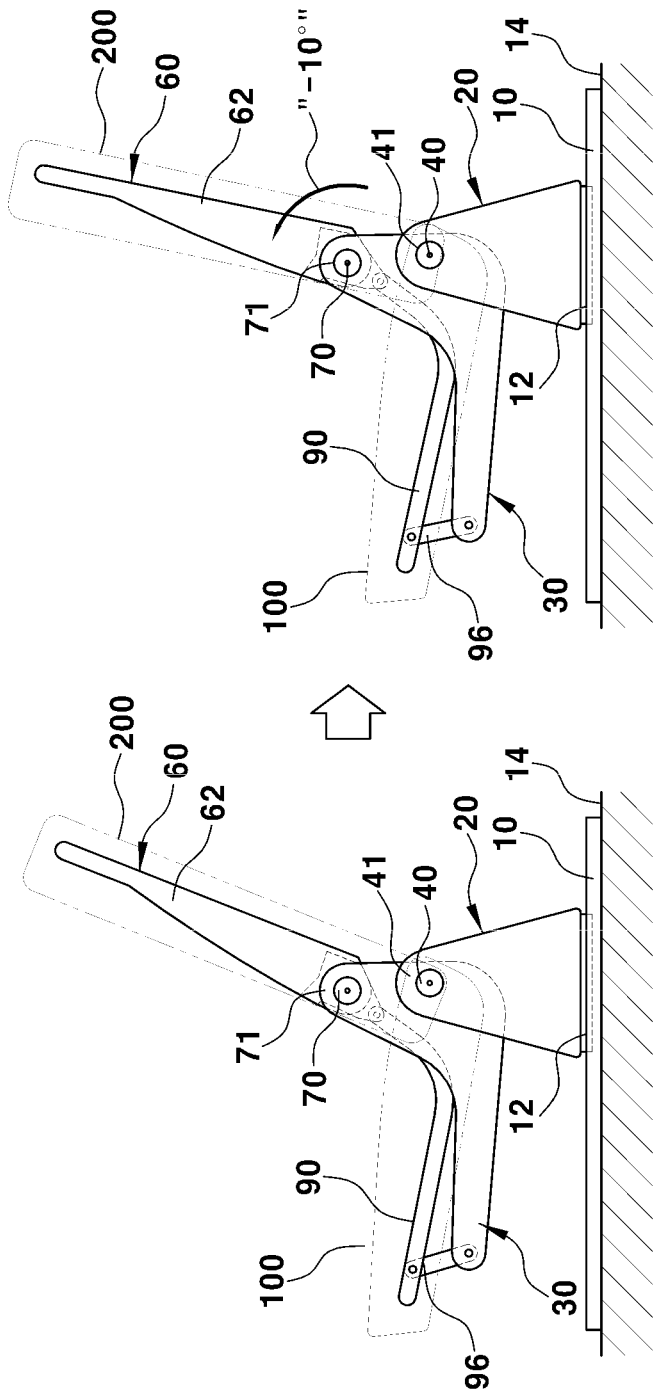

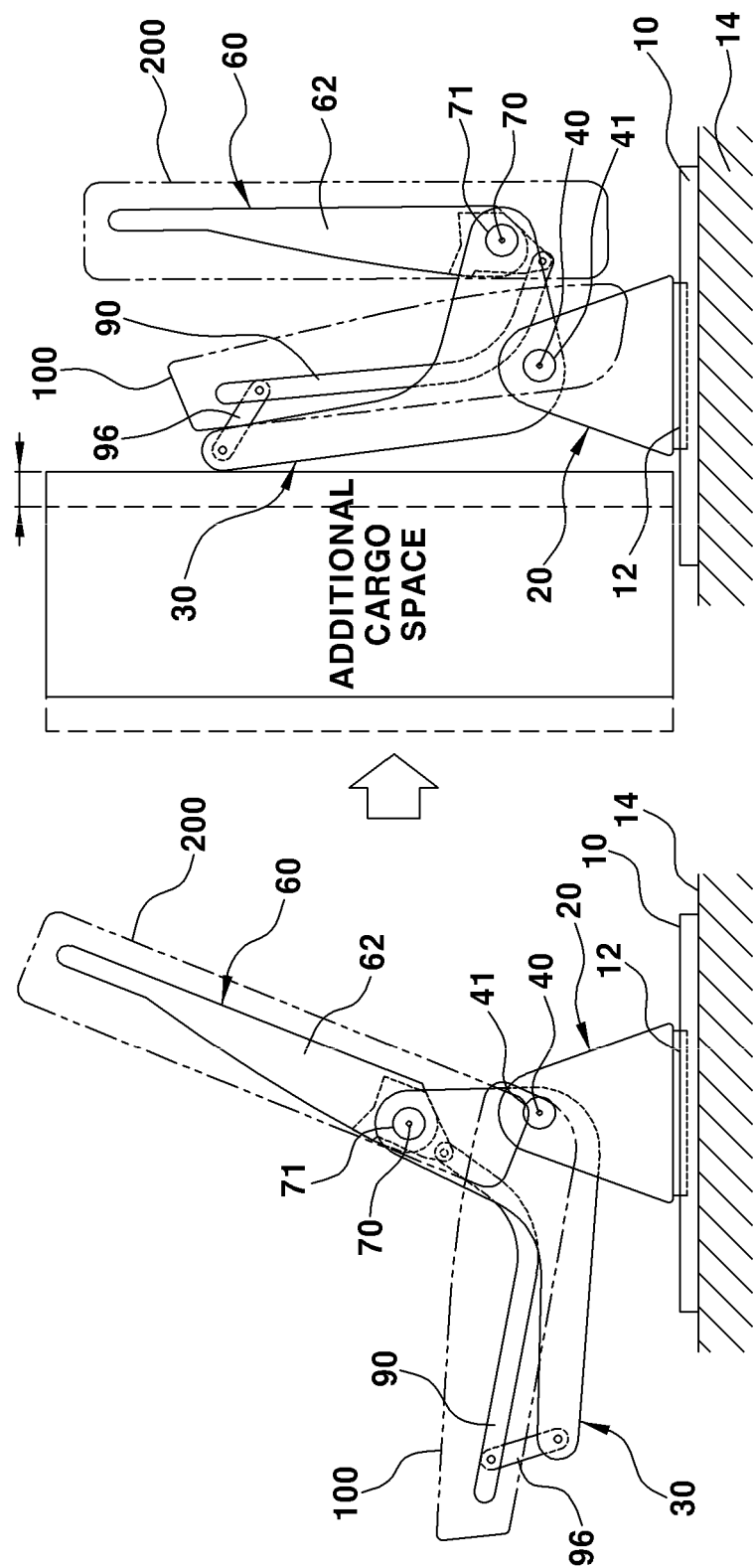

SEAT FOR VEHICLE

CROSS-REFERENCE TO RELATED APPLICATION

This application claims under 35 U.S.C. § 119(a) the benefit of Korean Patent Application No. 10-2021-0166380, filed on Nov. 29, 2021, the entire contents of which are incorporated herein by reference.

TECHNICAL FIELD

The present disclosure relates to a seat for a vehicle. More particularly, it relates to a seat for a vehicle capable of variously adjusting seat positions using a double hinge shaft.

DESCRIPTION OF RELATED ART

Generally, a seat for a vehicle fundamentally includes a seat cushion on which a passenger's lower body is seated, a seatback on which the passenger's upper body leans, and a headrest configured to support the passenger's neck and head, and a seat mechanism, capable of variously changing a seat position depending on the body shape of the passenger and the situation, may be mounted on such a seat.

Furthermore, in a case of a seat for an autonomous vehicle to be released in the future, it will be necessary to mount a seat mechanism capable of adjusting a seat position for loading cargo, adjusting a seat swivel for conversation with passengers in rear seats, and adjusting a relaxation position for resting and sleeping.

The above information disclosed in this Background section is only for enhancement of understanding of the background of the invention, and therefore it may contain information that does not form the prior art that is already known in this country to a person of ordinary skill in the art.

SUMMARY OF THE DISCLOSURE

The present invention has been made in an effort to solve the above-described problems associated with the prior art, and it is an object of the present invention to provide a seat for a vehicle configured to variously adjust a seat position between, for example, a full-flat mode, a relaxation mode, a cushion tip-up mode, a full-bed mode, a walk-in mode, and a rear-view mode, by using a first hinge shaft to rotate the entire seat, including a seatback and a seat cushion, and a second hinge shaft to rotate the seatback.

In one embodiment, the present invention provides a seat for a vehicle, the seat including a pair of support brackets mounted on a floor panel so as to be movable forwards and rearwards, seat cushion support frames, each connected to a corresponding one of the pair of support brackets so as to be rotatable forwards and rearwards and positioned at a predetermined height from the floor panel, a first hinge shaft passing through rear end portions of the seat cushion support frames and having opposite ends thereof connected to upper portions of the pair of support brackets, a first motor mounted on one of the seat cushion support frames so as to rotate the seat cushion support frames using an operating force for rotation about the first hinge shaft, a second hinge shaft passing through side plates of a seatback frame and having opposite ends thereof connected to upper rear end portions of the seat cushion support frames, a second motor mounted on the side plate of the seatback frame so as to rotate the seatback frame using an operating force for rotation about the second hinge shaft, and interlocking frames each having a rear end portion thereof hinge-coupled to a lower end portion of the side plate of the seatback frame and having a front end portion thereof connected to a front end portion of the seat cushion support frame by a hinge.

In some embodiments, the second hinge shaft connects the side plates of the seatback frame.

In a preferred embodiment, the front end portion of the interlocking frame and the front end portion of the seat cushion support frame may be provided with a support link hinge-coupled therebetween.

In another preferred embodiment, the seat for a vehicle may further include a controller configured to control an amount of rotation of each of the first motor and the second motor, wherein the controller may be mounted on a lower plate, and the lower plate may be mounted on a connection pipe that connects the rear end portions of the seat cushion support frames.

In still another preferred embodiment, the first motor may be fixedly mounted on an inner surface of the seat cushion support frame by a connecting bar, and a gearbox portion of the first motor may be connected to the first hinge shaft so as to be rotatable about the first hinge shaft.

In yet another preferred embodiment, the second motor may be fixedly mounted on an inner surface of the seatback frame by a connecting bar, and a gearbox portion of the second motor may be connected to the second hinge shaft so as to be rotatable about the second hinge shaft.

In some embodiments, a ring gear, which is a final output gear connected to a motor output shaft, may be installed in the gearbox portion of the first motor.

In some embodiments, a pinion gear may be mounted on the first hinge shaft coupled to the gear box portion of the first motor.

In still yet another preferred embodiment, first bearings configured to rotatably support the seat cushion support frames may be individually mounted at a portion of the rear end portion of the seat cushion support frame through which the first hinge shaft passes, and first support cores to which opposite ends of the first hinge shaft are fixedly connected may be mounted on the pair of support brackets.

In a further preferred embodiment, second bearings configured to rotatably support the seatback frame may be individually mounted at a portion of the side plate of the seatback frame through which the second hinge shaft passes, and second support cores to which the opposite ends of the second hinge shaft are fixedly connected may be mounted on the seat cushion support frames.

In another further preferred embodiment, a lower end portion of the support bracket may be mounted on a moving rail, and a fixed rail to which the moving rail is movably coupled may be mounted on the floor panel.

In still another further preferred embodiment, as the height of a point in the rear end portion of the seat cushion support frame, which is the point through which opposite ends of the first hinge shaft pass, is lowered, the position at which the seat cushion support frame is vertically erected may be adjusted to be slanted further rearwards.

In yet another further preferred embodiment, the seatback frame may be rotated in one direction about the second hinge shaft by operation of the second motor so as to be folded onto the seat cushion, after which the seat cushion support frame may be rotated at a predetermined angle in the one direction about the first hinge shaft by operation of the first motor so as to be tilted downwards and forwards, thereby implementing a full-flat mode in which the rear surface of a seatback is flush with a luggage board.

In still yet another further preferred embodiment, the seatback frame may be rotated in a different direction at a predetermined angle about the second hinge shaft by operation of the second motor so as to be reclined, after which the seat cushion support frame may be rotated at a predetermined angle in the different direction about the first hinge shaft by operation of the first motor so as to be tilted upwards and forwards, thereby implementing a relaxation mode.

In a still further preferred embodiment, the seatback frame may be rotated in one direction about the second hinge shaft by operation of the second motor so as to be folded onto the seat cushion, after which the seat cushion support frame may be rotated at a predetermined angle in a different direction about the first hinge shaft by operation of the first motor so as to be vertically erected, thereby implementing a cushion tip-up mode in which the seat cushion is vertically erected together with a seatback.

In another still further preferred embodiment, the seatback frame may be rotated in a different direction about the second hinge shaft by operation of the second motor so as to be maximally reclined, after which a rear end portion of the interlocking frame and a rear end portion of the seat cushion may rise at the same time, and after that, the seat cushion support frame may be rotated at a predetermined angle in the different direction about the first hinge shaft by operation of the first motor so as to be tilted upwards and forwards, thereby implementing a full-bed mode in which a seatback and a seat cushion are arranged to be flat and parallel to the floor panel.

In yet still further preferred embodiment, the seat cushion support frame may be rotated at a predetermined angle in one direction about the first hinge shaft so as to be tilted downwards and forwards and the seatback frame may be vertically erected by operation of the first motor at the same time, after which a moving rail coupled to the support bracket may be moved forwards along a fixed rail, thereby implementing a walk-in mode in which a passage for entry and exit is secured between a car door and a rear-row seat.

In another yet still further preferred embodiment, the seat cushion support frame may rotate at a predetermined angle in a different direction about the first hinge shaft so as to be vertically erected, and a seatback may be aligned with a seat cushion of a rear-row seat in a line at the same time, thereby implementing a rear-view mode in which a seat cushion faces a seatback of the rear-row seat.

Other embodiments and preferred embodiments of the invention are discussed infra.

As discussed, the method and system suitably include use of a controller or processer.

In another embodiment, vehicles are provided that comprise an apparatus as disclosed herein.

In a fully autonomous vehicle or system, the vehicle may perform all driving tasks under all conditions and little or no driving assistance is required from a human driver. In semi-autonomous vehicle, for example, the automated driving system may perform some or all parts of the driving task in some conditions, but a human driver regains control under some conditions, or in other semi-autonomous systems, the vehicle's automated system may oversee steering and accelerating and braking in some conditions, although the human driver is required to continue paying attention to the driving environment throughout the journey, while also performing the remainder of the necessary tasks.

In certain embodiments, the present systems and vehicles may be fully autonomous. In other certain embodiments, the present systems and vehicles may be semi-autonomous.

The above and other features of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein:

FIGS. 5A and 5B are side views illustrating an operation in which a full-flat mode of the seat for a vehicle according to the present invention is implemented;

FIGS. 7A and 7B are side views illustrating an operation in which a cushion tip-up mode of the seat for a vehicle according to the present invention is implemented;

FIGS. 10A and 10B are side views illustrating an operation in which a rear-view mode of the seat for a vehicle according to the present invention is implemented; and FIG. 11 is a side view showing an example in which the height of a point at which the first hinge shaft of the seat for a vehicle according to the present invention is connected to the seat cushion support frame is adjusted to be lowered.

Figure 1:
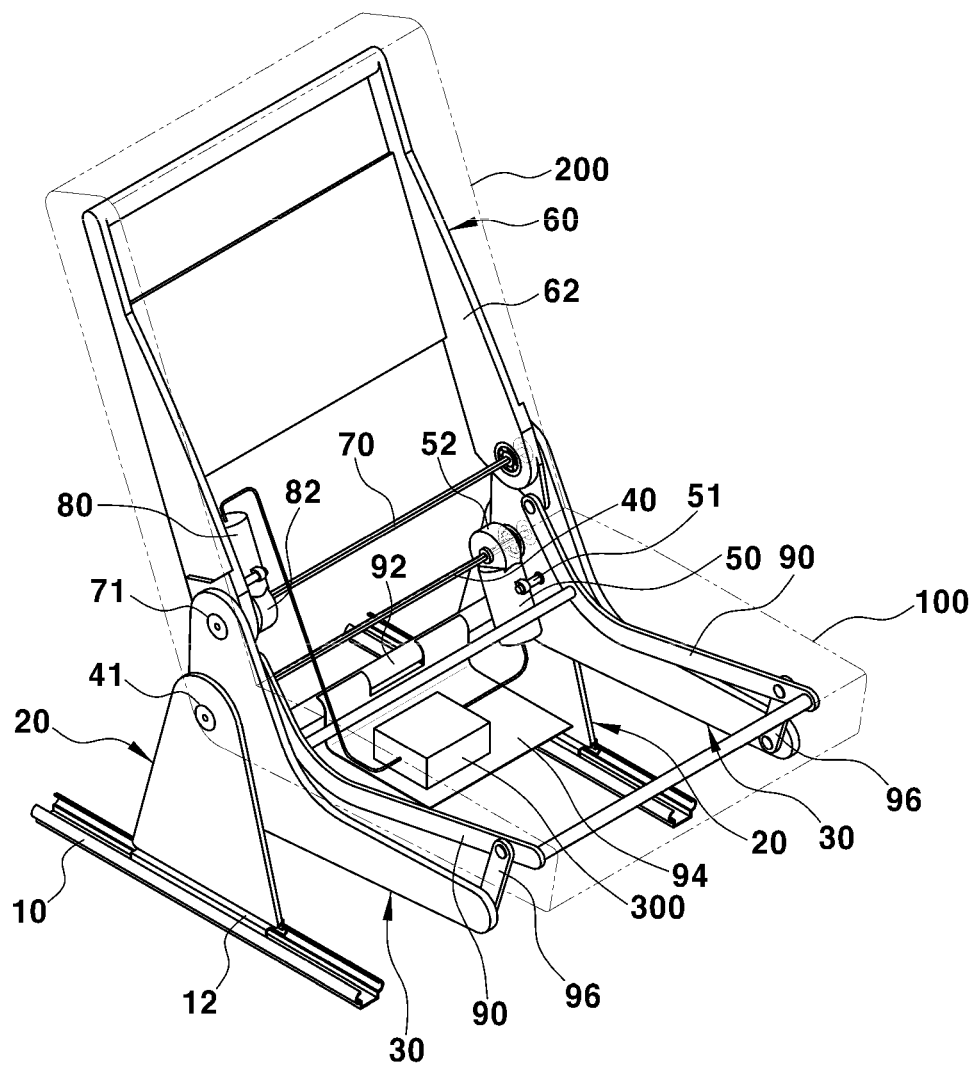
FIG. 1 is a perspective view illustrating a seat for a vehicle according to the present invention.
Figure 2:
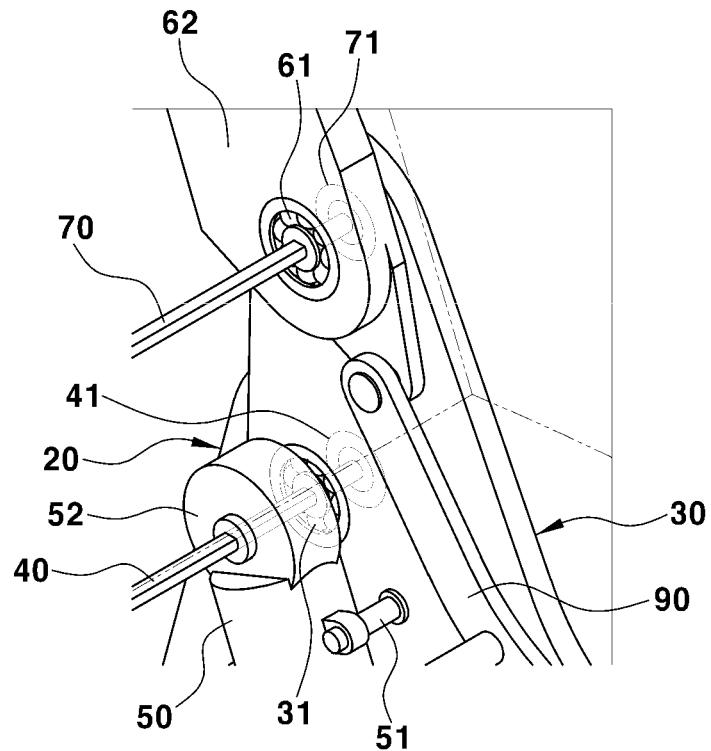
FIG. 2 is an enlarged view illustrating a main part of a mounting structure of a first motor and a first hinge shaft of the seat for a vehicle according to the present invention.
Figure 3:
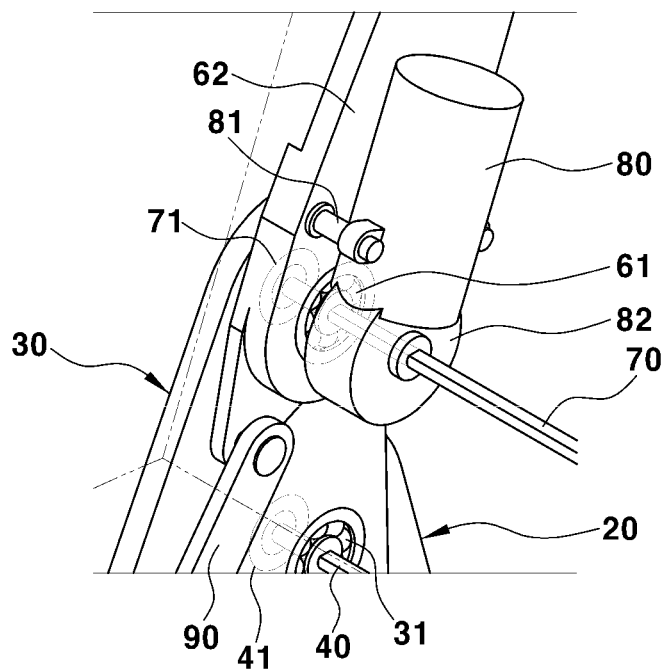
FIG. 3 is an enlarged view illustrating a main part of a mounting structure of a second motor and a second hinge shaft of the seat for a vehicle according to the present invention.
Figure 4:
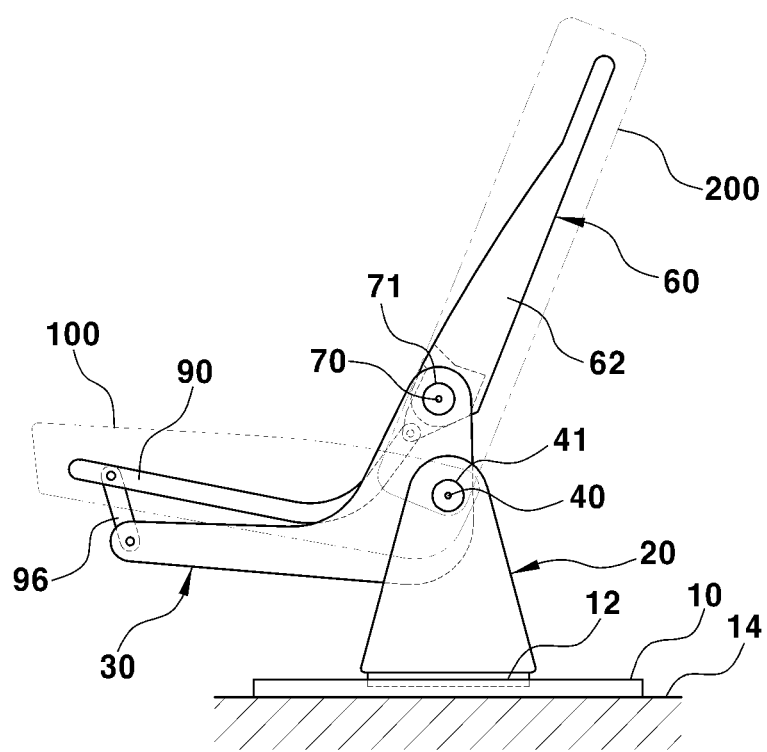
FIG. 4 is a side view illustrating the seat for a vehicle according to the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes, will be determined in part by the particular intended application and use environment.

In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Hereinafter, preferred embodiments of the present invention will be described with reference to the accompanying drawings.

FIGS. 1 to 4 illustrate a configuration to adjust the position of a seat for a vehicle according to the present invention, and reference numeral 20 in each of the drawings indicates a support bracket.

The support bracket 20 may be provided in a pair, and mounted to be movable forwards and rearwards on a floor panel 14 inside the vehicle.

For this, as illustrated in FIGS. 1 to 4, a pair of fixed rails 10 may be mounted on the floor panel 14 inside the vehicle, and moving rails 12 may be fastened to the fixed rails 10 so as to be movable forwards and rearwards.

Accordingly, the lower end portion of each of the support brackets 20 may be fixedly mounted on the moving rail 12, and thus, when the moving rail 12 is moved forwards and rearwards along the fixed rail 10, the support bracket 20 may also be moved together with the moving rail 12.

Here, since seat cushion support frames 30 are individually connected to an inner surface of the support bracket 20 so as to be rotatable forwards and rearwards, the seat cushion support frame 30 may be disposed at a side portion of a seat cushion 100 and positioned at a predetermined height from the floor panel 14.

In particular, between rear end portions of the seat cushion support frames 30, there is a connected first hinge shaft 40.

Preferably, the first hinge shaft 40 may passe through the rear end portions of the seat cushion support frames 30, and opposite ends thereof may be fixed to upper portions of the support brackets 20, and are not rotatable.

For this, first bearings 31, configured to rotatably support the seat cushion support frame 30, may be each mounted at a portion of the rear end portion of the seat cushion support frame 30 through which the first hinge shaft 40 passes, and first support cores 41, to which opposite ends of the first hinge shaft 40 are fixedly connected, may be mounted on the support bracket 20.

Accordingly, the seat cushion support frame 30 may be rotatable forwards and rearwards about the first hinge shaft 40.

Here, as an operating means that exerts an operating force to rotate the seat cushion support frames 30 about the first hinge shaft 40, a first motor 50 may be mounted on one of the seat cushion support frames 30.

In more detail, the first motor 50 may be fixedly mounted on the inner surface of one of the seat cushion support frames 30 by a connecting bar 51, and a gearbox portion 52 of the first motor 50 may be connected to the first hinge shaft 40 so as to be rotatable about the first hinge shaft 40.

For example, a ring gear (not illustrated), which is a final output gear connected to a motor output shaft, may be installed in the gearbox portion 52 of the first motor 50, and a pinion gear (not illustrated) may be mounted on the first hinge shaft 40 coupled to the gearbox portion 52. With this configuration, when the rotational force generated by operation of the first motor 50 is applied to the ring gear of the gearbox portion 52, the ring gear rotates following the pinion gear as if the ring gear revolves around the pinion gear, and eventually, the gearbox portion 52 rotates about the first hinge shaft 40.

In addition, when the gearbox portion 52 rotates about the first hinge shaft 40, the first motor 50, which is integrated with the gearbox portion 52, and the seat cushion support frame 30, which is connected to the first motor 50 by the connecting bar 51, may also rotate forwards and rearwards about the first hinge shaft 40.

In particular, a second hinge shaft 70 may connect side plates 62 of a seatback frame 60.

Preferably, the second hinge shaft 70 may pass through lower end portions of the side plates of the seatback frame 60, and opposite ends thereof may be fixed to upper rear end portions of the seat cushion support frames 30, and not rotatable.

For this, second bearings 61, configured to rotatably support the seatback frame 60, may be each mounted at a portion of the lower end portion of the side plate 62 of the seatback frame 60 through which the second hinge shaft 70 passes, and a second support cores 71, to which opposite ends of the second hinge shaft 70 are fixedly connected, may be mounted on the seat cushion support frames 30.

Accordingly, the seatback frame 60 may be rotatable forwards and rearwards about the second hinge shaft 70.

Here, as an operating means that exerts an operating force to rotate the seatback frame 60 about the second hinge shaft 70, a second motor 80 may be mounted on one of the side plates 62 of the seatback frame 60.

In more detail, the second motor 80 may be fixedly mounted on the inner surface of one of the side plates 62 of the seatback frame 60 by a connecting bar 81, and a gearbox portion 82 of the second motor 80 may be connected to the second hinge shaft 70 so as to be rotatable about the second hinge shaft 70.

For example, a ring gear (not illustrated), which is a final output gear connected to a motor output shaft, may be installed in the gearbox portion 82 of the second motor 80, and a pinion gear (not illustrated) may be mounted on the second hinge shaft 70 coupled to the gearbox portion 82. With this configuration, when the rotational force generated by operation of the second motor 80 is applied to the ring gear of the gearbox portion 82, the ring gear rotates following the pinion gear as if the ring gear revolves around the pinion gear, and eventually, the gearbox portion 82 rotates about the second hinge shaft 70.

In addition, when the gearbox portion 82 rotates about the second hinge shaft 70, the second motor 80, which is integrated with the gearbox portion 82, and the seatback frame 60, which is connected to the second motor 80 by the connecting bar 81, may also rotate forwards and rearwards about the second hinge shaft 70.

Here, connection pipe 92 may connect between the rear end portions of the seat cushion support frames 30 so as to reinforce rigidity, and a lower plate 94 may be mounted to the connection pipe 92. In addition, a controller 300 configured to control the amount of rotation of the first motor 50 and the second motor 80 is mounted on the lower plate 94. Meanwhile, interlocking frames 90 may be each hinge-connected to a corresponding one of the side plates 62 of the seatback frame 60 and to a corresponding one of the seat cushion support frames 30 so as to allow an operation of tilting the seat cushion support frames 30 to be performed in conjunction with an operation in which the seatback frame 60 is inclined forward or rearward.

In other words, a rear end portion of the interlocking frame 90 may be hinge-coupled by a hinge shaft 91 to the lower end portion of the side plate 62 of the seatback frame 60, and a front end portion of the interlocking frame 90 may be hinge-coupled to a front end portion of the seat cushion support frame 30. As illustrated in FIGS. 2, 5A, 5B, 8A, and 8B, the hinge shaft 91 is positioned at a lower height than the second hinge shaft. 70 to implement a full-flat mode and a full-bed mode.

Preferably, the front end portion of the interlocking frame 90 and the front end portion of the seat cushion support frame 30 may be provided with the support link 96 hinge-coupled therebetween in order to limit the tilting angle while ensuring an operation of tilting the interlocking frame 90.

Here, the operation flow of the seat for a vehicle of the present invention having the above-described configuration is as follows.

Full-Flat Mode

Figure 5B:
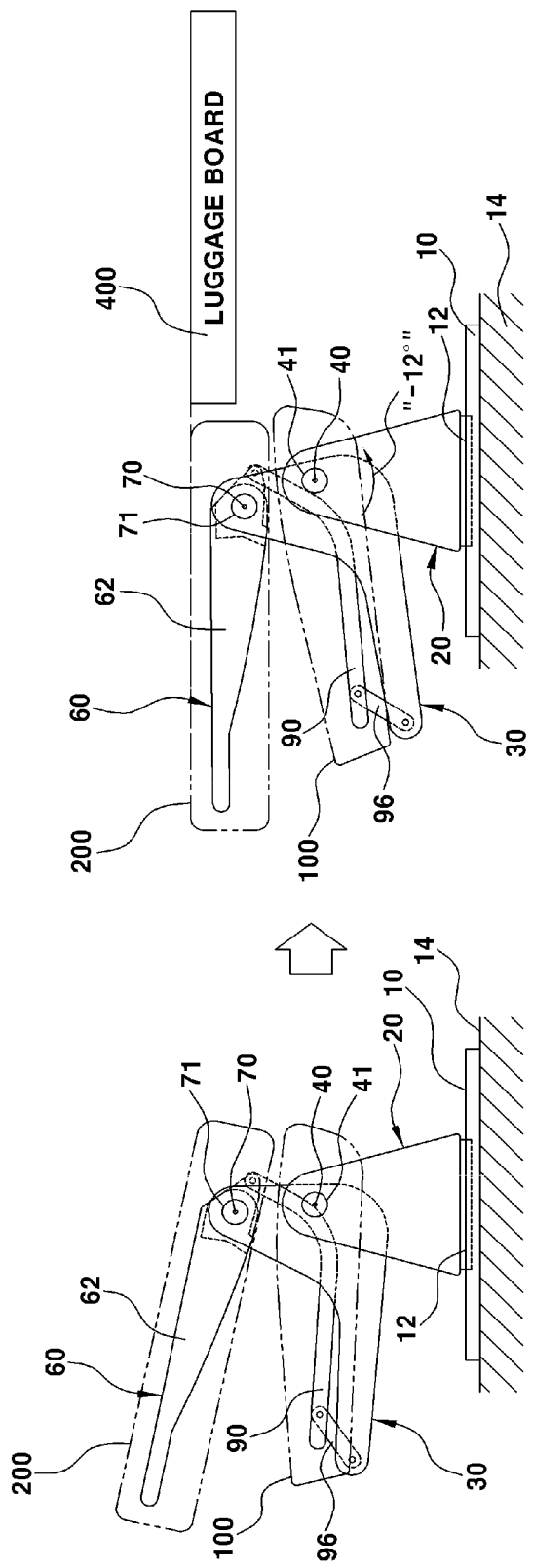

FIGS. 5A and 5B are side views illustrating an operation in which a full-flat mode of the seat for a vehicle according to the present invention is implemented.

The full-flat mode is a mode in which a rear surface of the seatback is adjusted to be flush with a luggage board, constituting a floor of a luggage compartment, so as to provide a wide space for loading items and an indoor resting space.

For this, first, the second motor 80 may be operated to rotate the seatback frame 60 in one direction (the direction toward the front of the vehicle) about the second hinge shaft 70 so as to fold the seatback 200 onto a seat cushion 100, as illustrated in FIG. 5A.

For example, through control of current by the controller 300, the second motor 80 may be operated by the rotation amount at which the seatback 200 is folded onto the seat cushion 100, thereby allowing the seatback 200 to rotate about −100° from a default position so as to be folded onto the seat cushion 100.

Here, when the rotational force generated by the operation of the second motor 80 is applied to the ring gear of the gearbox portion 82, the ring gear may rotate following the pinion gear as if the ring gear revolves around the pinion gear, and eventually, the gearbox portion 82 may rotate in one direction (the direction toward the front of the vehicle) about the second hinge shaft 70.

After that, when the gearbox portion 82 rotates in one direction (the direction toward the front of the vehicle) about the second hinge shaft 70, the second motor 80, integrated with the gearbox portion 82, and the seatback frame 60, connected to the second motor 80 by the connecting bar 81, may also rotate in one direction (the direction toward the front of the vehicle) about the second hinge shaft 70 to thereby allow the seatback 200 to be folded onto the seat cushion 100.

In addition, when the seatback 200 is folded, the front end portion of the interlocking frame 90 is lowered, and at the same time, the front end portion of the seat cushion 100 may be also lowered.

That is, when the seatback frame 60 is rotated in one direction (the direction toward the front of the vehicle) about the second hinge shaft 70 so as to fold the seatback 200, the point at which the side plate 62 of the seatback frame 60 and the rear end portion of the interlocking frame 90 are hinge-connected may be lowered toward the rear, thereby pulling down the front end portion of the interlocking frame 90, and accordingly, the front end portion of the seat cushion 100 surrounding the interlocking frame 90 may be also lowered.

As the front end portion of the seat cushion 100 is lowered, the seatback 200 may be more easily folded onto the seat cushion 100.

Thereafter, by the operation of the first motor 50, the seat cushion support frame 30 may be rotated at a predetermined angle in one direction (the direction toward the front of the vehicle) about the first hinge shaft 40 so as to be tilted downwards and forwards, and accordingly, the rear surface of the seatback 200 may be flush with the luggage board 400, as illustrated in FIG. 5B.

For example, through control of current by the controller 300, the first motor 50 may be operated by the amount of rotation whereby the seat cushion support frame 30 is rotated at an angle of about −12° in one direction (the direction toward the front of the vehicle) about the first hinge shaft 40.

Here, as the rotational force generated by the operation of the first motor 50 is applied to the ring gear of the gearbox portion 52, the ring gear may rotate following the pinion gear as if the ring gear revolves around the pinion gear, and eventually, the gearbox portion 52 may rotate in one direction (the direction toward the front of the vehicle) about the first hinge shaft 40.

In addition, when the gearbox portion 52 rotates about the first hinge shaft 40, the first motor 50, integrated with the gearbox portion 52, and the seat cushion support frame 30, connected to the first motor 50 by the connecting bar 51, may also rotate in one direction (the direction toward the front of the vehicle) about the first hinge shaft 40.

As such, after the seatback 200 is folded onto the seat cushion 100 about the second hinge shaft 70, the seat cushion support frame 30 may be rotated at a predetermined angle in one direction (the direction toward the front of the vehicle) about the first hinge shaft 40 so as to be tilted downwards and forwards, and at the same time, the seat cushion 100 and the seatback 200 may be also tilted at the same angle, thereby enabling the full-flat mode in which the rear surface of the seatback 200 is flush with the luggage board 400 to be easily implemented.

Relaxation Mode

Figure 6A:
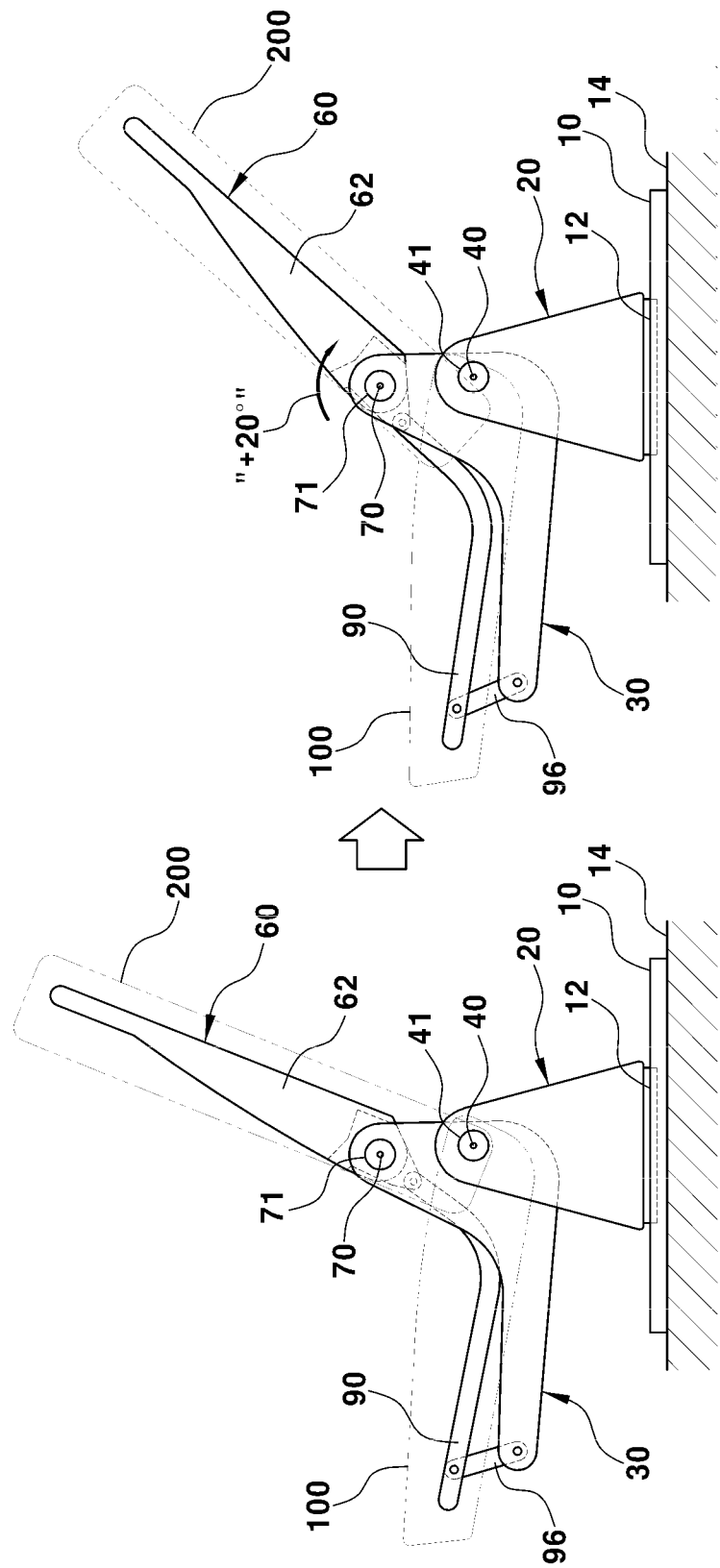
FIGS. 6A and 6B are side views illustrating an operation in which a relaxation mode of the seat for a vehicle according to the present invention is implemented.
Figure 6B:
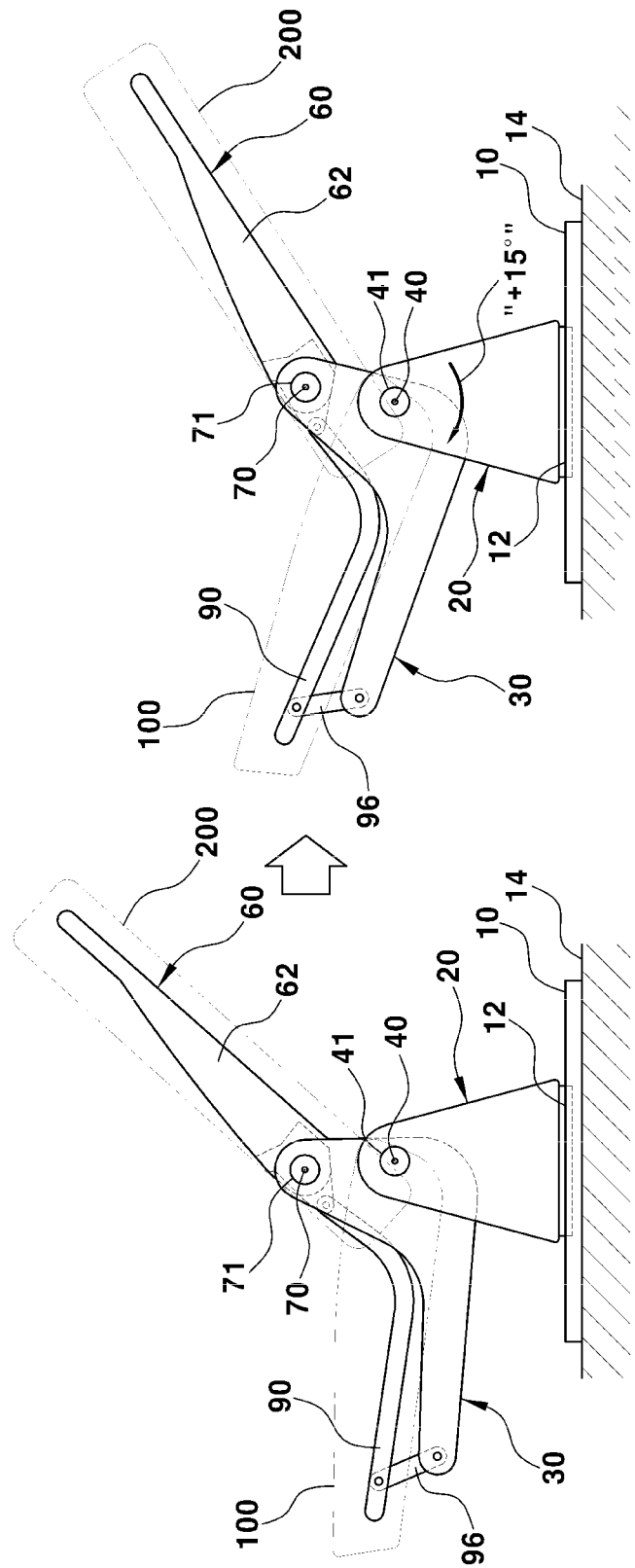

FIGS. 6A and 6B are side views illustrating an operation in which a relaxation mode of the seat for a vehicle according to the present invention is implemented.

The relaxation mode is a mode in which the seat cushion is tilted upwards toward the front while the seatback is reclined so that a passenger can rest comfortably in a zero-gravity posture.

For this, first, the second motor 80 may be operated to rotate the seatback frame 60 in the other direction (the direction toward the rear of the vehicle) by a predetermined angle about the second hinge shaft 70 so as to recline the seatback 200, as illustrated in FIG. 6A.

For example, through control of current by the controller 300, the second motor 80 may be operated by the amount of rotation whereby the seatback frame 60 is rotated at an angle of about +20° in the other direction (the direction toward the rear of the vehicle) about the second hinge shaft 70.

At this time, as described above, the gearbox portion 82 may rotate in the other direction (the direction toward the rear of the vehicle) about the second hinge shaft 70 by the operation of the second motor 80.

After that, when the gearbox portion 82 rotates in the other direction (the direction toward the rear of the vehicle) about the second hinge shaft 70, the second motor 80, integrated with the gearbox portion 82, and the seatback frame 60, connected to the second motor 80 by the connecting bar 81, may also rotate in the other direction (the direction toward the rear of the vehicle) about the second hinge shaft 70 to thereby allow the seatback 200 to be reclined.

Thereafter, by the operation of the first motor 50, the seat cushion support frame 30 may be rotated at a predetermined angle in the other direction (the direction toward the rear of the vehicle) about the first hinge shaft 40 so as to be tilted upwards and forwards along with the seat cushion support frame 30, as illustrated in FIG. 6B.

For example, through control of current by the controller 300, the first motor 50 may be operated by the amount of rotation whereby the seat cushion support frame 30 is rotated at an angle of about +15° in the other direction (the direction toward the rear of the vehicle) about the first hinge shaft 40.

At this time, the gearbox portion 52 may be rotated in the other direction (the direction toward the rear of the vehicle) about the first hinge shaft 40 by the operation of the first motor 50.

In addition, when the gearbox portion 52 rotates about the first hinge shaft 40, the first motor 50, integrated with the gearbox portion 52, and the seat cushion support frame 30, connected to the first motor 50 by the connecting bar 51, may also rotate in the other direction (the direction toward the rear of the vehicle) about the first hinge shaft 40, thereby orienting the seat cushion 100 to be tilted upwards and forwards.

As such, after the seatback 200 is reclined about the second hinge shaft 70, the seat cushion support frame 30 may be rotated at a predetermined angle in the other direction (the direction toward the rear of the vehicle) about the first hinge shaft 40 so as to tilt the seat cushion 100 upwards and forwards, thereby allowing the relaxation mode in which a passenger can rest comfortably in a zero-gravity posture to be easily implemented.

Cushion Tip-Up Mode

Figure 7B:
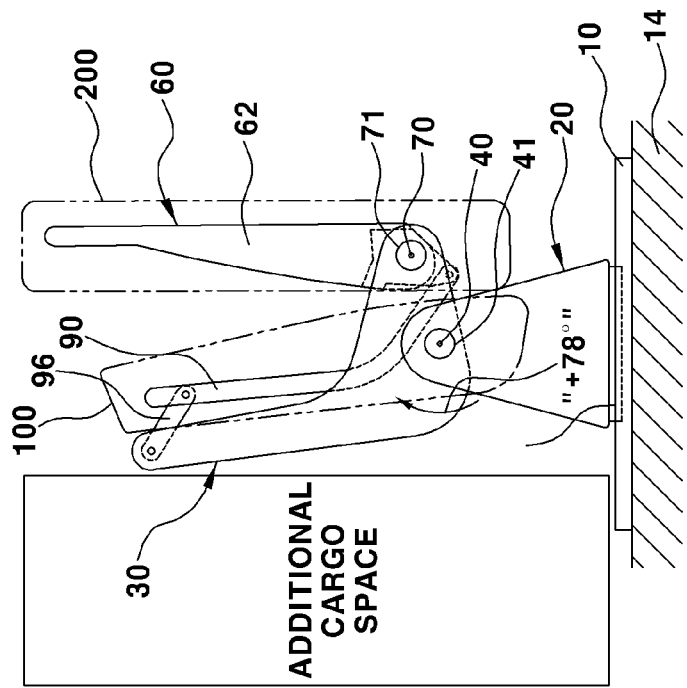
Figure 7B:
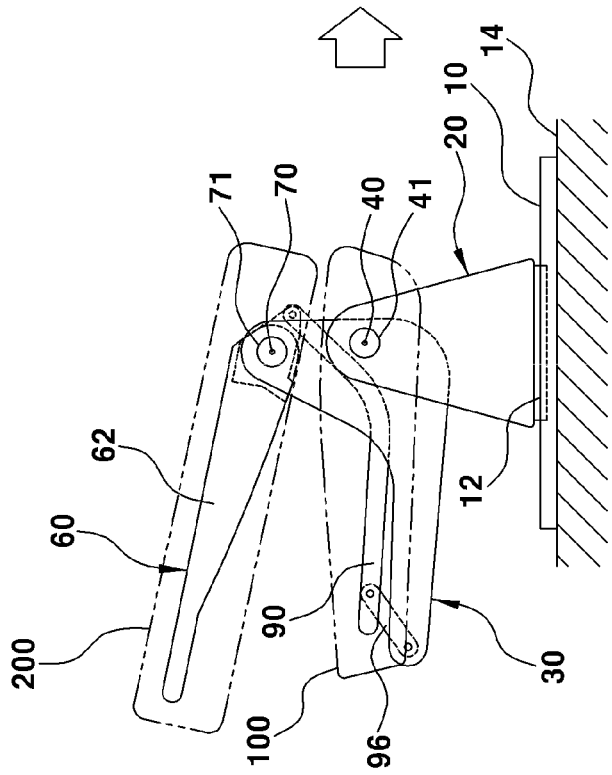

FIGS. 7A and 7B are side views illustrating an operation in which a cushion tip-up mode of the seat for a vehicle according to the present invention is implemented.

The cushion tip-up mode refers to a mode in which the space in front of the seat can be utilized as a cargo loading space by folding the seatback onto the seat cushion and then vertically erecting the seatback and the seat cushion.

For this, first, the second motor 80 may be operated to rotate the seatback frame 60 in one direction (the direction toward the front of the vehicle) about the second hinge shaft 70 so as to fold the seatback 200 onto the seat cushion 100, as illustrated in FIG. 7A.

For example, through control of current by the controller 300, the second motor 80 may be operated by the rotation amount at which the seatback 200 is folded onto the seat cushion 100, thereby allowing the seatback 200 to rotate about −100° from a default position so as to be folded onto the seat cushion 100.

At this time, the gearbox portion 82 may be rotated in one direction (the direction toward the front of the vehicle) about the second hinge shaft 70 by the operation of the second motor 80.

After that, when the gearbox portion 82 rotates in one direction (the direction toward the front of the vehicle) about the second hinge shaft 70, the second motor 80, integrated with the gearbox portion 82, and the seatback frame 60, connected to the second motor 80 by the connecting bar 81, may also rotate in one direction (the direction toward the front of the vehicle) about the second hinge shaft 70 to thereby allow the seatback 200 to be folded onto the seat cushion 100.

Thereafter, by the operation of the first motor 50, the seat cushion support frame 30 may be rotated at a predetermined angle in the other direction (the direction toward the rear of the vehicle) about the first hinge shaft 40 so as to allow the seatback 200 to be vertically erected, and at the same time, to allow the seat cushion 100 to be almost vertically erected together with the seat cushion support frame 30, as illustrated in FIG. 7B.

For example, through control of current by the controller 300, the first motor 50 may be operated by the amount of rotation whereby the seat cushion support frame 30 is rotated at an angle of about +79° in the other direction (the direction toward the rear of the vehicle) about the first hinge shaft 40.

At this time, the gearbox portion 52 may be rotated in the other direction (the direction toward the rear of the vehicle) about the first hinge shaft 40 by the operation of the first motor 50.

In addition, when the gearbox portion 52 rotates about the first hinge shaft 40, the first motor 50, integrated with the gearbox portion 52, and the seat cushion support frame 30, connected to the first motor 50 by the connecting bar 51, may also rotate in the other direction (the direction toward the rear of the vehicle) about the first hinge shaft 40, thereby allowing the seatback 200 to be vertically erected, and at the same time, allowing the seat cushion 100 to be almost vertically erected together with the seat cushion support frame 30.

As such, after the seatback 200 is folded onto the seat cushion 100 about the second hinge shaft 70, the seat cushion support frame 30 may be rotated in the other direction (the direction toward the rear of the vehicle) about the first hinge shaft 40 so as to orient the seatback 200 and the seat cushion 100 upright, thereby enabling the cushion tip-up mode, in which the space in front of the seat can be utilized as a cargo loading space, to be easily implemented.

Meanwhile, as the height of a point in the rear end portion of the seat cushion support frame 30 through which the opposite ends of the first hinge shaft 40 pass is lowered, the position at which the seat cushion support frame 30 is vertically erected may be adjusted to be slanted further rearwards.

More specifically, as the height of the point in the rear end portion of the seat cushion support frame 30 through which the opposite ends of the first hinge shaft 40 pass is lowered as illustrated in FIG. 11, the extent of rotation of the seat cushion support frame 30 may increase, and thus the position at which the seat cushion support frame 30, the seat cushion 100, and the seatback 200 are vertically erected may be adjusted to be slanted further rearwards.

When the seat cushion support frame 30, the seat cushion 100, and the seatback 200 are adjusted to be slanted further rearwards, more space can be secured in front of the seat, thereby securing more space for loading cargo.

Full-Bed Mode

Figure 8A:
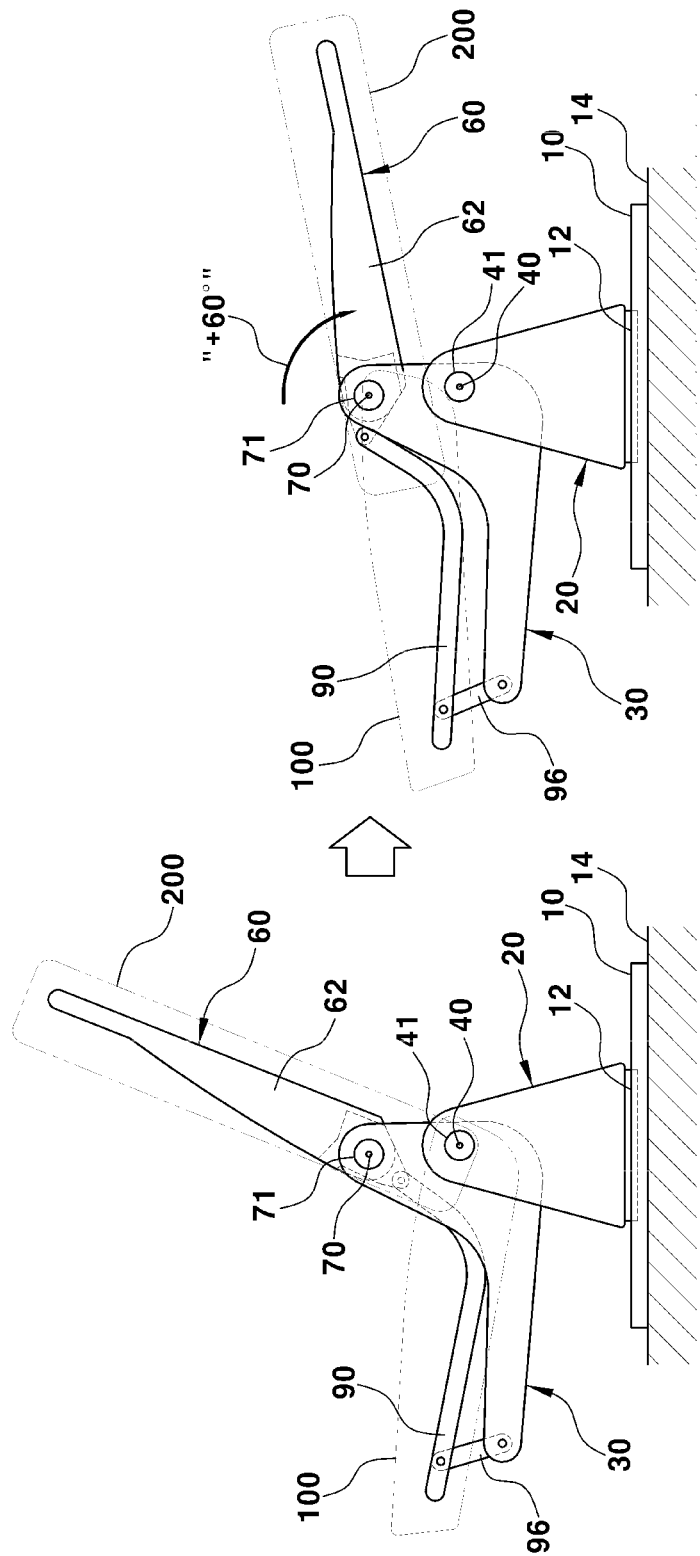
FIGS. 8A and 8B are side views illustrating an operation in which a full-bed mode of the seat for a vehicle according to the present invention is implemented.
Figure 8B:
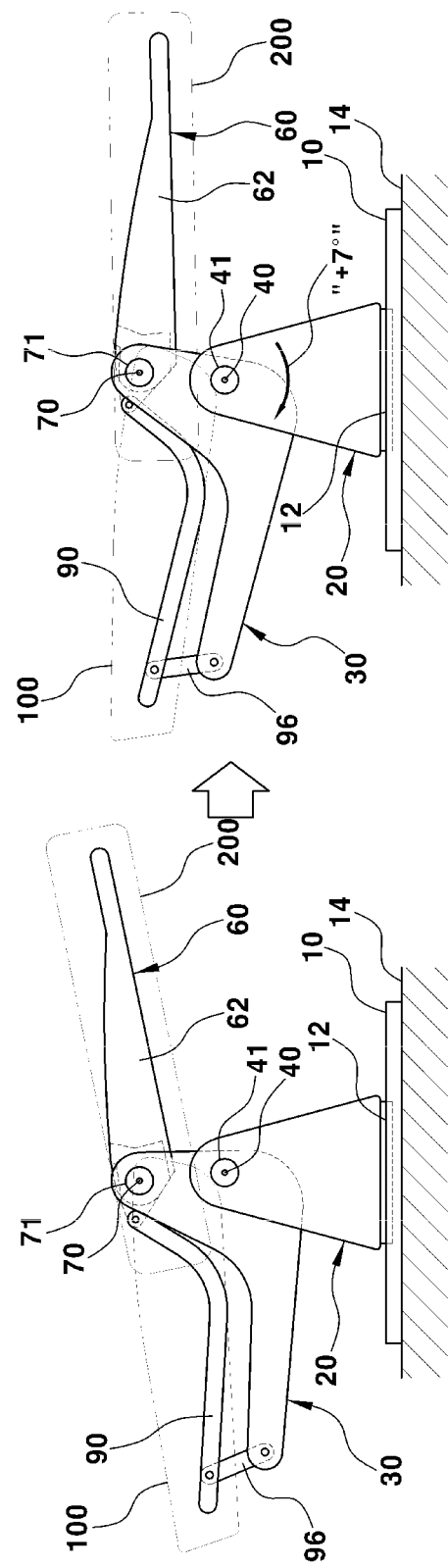

FIGS. 8A and 8B are side views illustrating an operation in which a full-bed mode of the seat for a vehicle according to the present invention is implemented.

The full-bed mode is a mode in which the seat cushion 100 and the seatback 200 are spread flat like a bed so that a passenger can lie down and rest.

For this, first, the second motor 80 may be operated to rotate the seatback frame 60 in the other direction (the direction toward the rear of the vehicle) by a predetermined angle about the second hinge shaft 70 so as to maximally recline the seatback 200, as illustrated in FIG. 8A.

For example, through control of current by the controller 300, the second motor 80 may be operated by the amount of rotation whereby the seatback frame 60 is rotated at an angle of about +60° in the other direction (the direction toward the rear of the vehicle) about the second hinge shaft 70.

At this time, as described above, the gearbox portion 82 may rotate in the other direction (the direction toward the rear of the vehicle) about the second hinge shaft 70 by the operation of the second motor 80.

After that, when the gearbox portion 82 rotates in the other direction (the direction toward the rear of the vehicle) about the second hinge shaft 70, the second motor 80, integrated with the gearbox portion 82, and the seatback frame 60, connected to the second motor 80 by the connecting bar 81, may also rotate in the other direction (the direction toward the rear of the vehicle) about the second hinge shaft 70 to thereby allow the seatback 200 to be maximally reclined.

In addition, when the seatback frame 60 is rotated in the other direction (the direction toward the rear of the vehicle) about the second hinge shaft 70 by the operation of the second motor 80 so as to allow the seatback 200 to be maximally reclined, the rear end portion of the interlocking frame 90 and the rear end portion of the seat cushion 100 may rise at the same time.

Here, the interlocking frame 90 may be hinge-connected to the side plate 62 of the seatback frame 60 and to the seat cushion support frame 30.

With this configuration, when the seatback frame 60 is rotated in the other direction (the direction toward the rear of the vehicle) about the second hinge shaft 70 so as to maximally recline the seatback 200, the point at which the side plate 62 of the seatback frame 60 and the rear end portion of the interlocking frame 90 are hinge-connected may be raised, thereby raising the rear end portion of the interlocking frame 90, and accordingly, the rear end portion of the seat cushion 100 surrounding the interlocking frame 90 may be also raised.

As such, the rear end portion of the seat cushion 100 may be raised while the seatback 200 is maximally reclined, and accordingly, the seatback 200 and the seat cushion 100 may lie in almost the same plane, as illustrated in FIG. 8A.

Thereafter, by the operation of the first motor 50, the seat cushion support frame 30 may be rotated at a predetermined angle in the other direction (the direction toward the rear of the vehicle) about the first hinge shaft 40 so as to be tilted upwards and forwards, and at the same time, the front end portion of the seat cushion 100 may be raised, as illustrated in FIG. 8B, thereby allowing the seat cushion 100 and the seatback 200 to be arranged to be flat and parallel to the floor panel.

For example, through control of current by the controller 300, the first motor 50 may be operated by the amount of rotation whereby the seat cushion support frame 30 is rotated at an angle of about +7° in the other direction (the direction toward the rear of the vehicle) about the first hinge shaft 40.

At this time, the gearbox portion 52 may be rotated in the other direction (the direction toward the rear of the vehicle) about the first hinge shaft 40 by the operation of the first motor 50.

In addition, when the gearbox portion 52 rotates about the first hinge shaft 40, the first motor 50, integrated with the gearbox portion 52, and the seat cushion support frame 30, connected to the first motor 50 by the connecting bar 51, may also rotate in the other direction (the direction toward the rear of the vehicle) about the first hinge shaft 40, thereby allowing the seat cushion support frame 30 to be tilted upwards and forwards, and at the same time, allowing the front end portion of the seat cushion 100 to be raised.

As such, after the rear end portion of the seat cushion 100 is raised while the seatback 200 is rotated about the second hinge shaft 70 so as to be maximally reclined, the seat cushion support frame 30 may be tilted upwards and forwards about the first hinge shaft 40, and at the same time, the front end portion of the seat cushion 100 may be raised, thereby allowing the full-bed mode, in which the seat cushion 100 and the seatback 200 are arranged to be flat and parallel to the floor panel, to be easily implemented.

Walk-In Mode

Figure 9A:
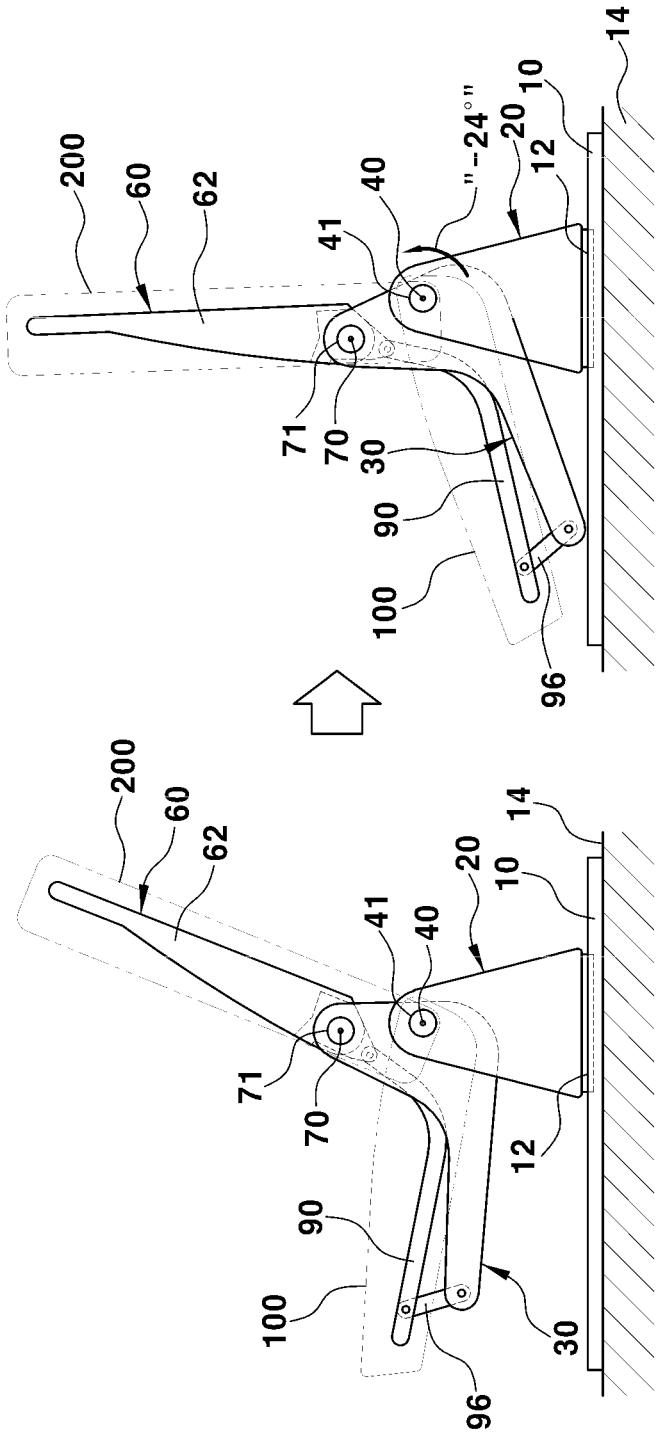
FIGS. 9A and 9B are side views illustrating an operation in which a walk-in mode of the seat for a vehicle according to the present invention is implemented.
Figure 9B:
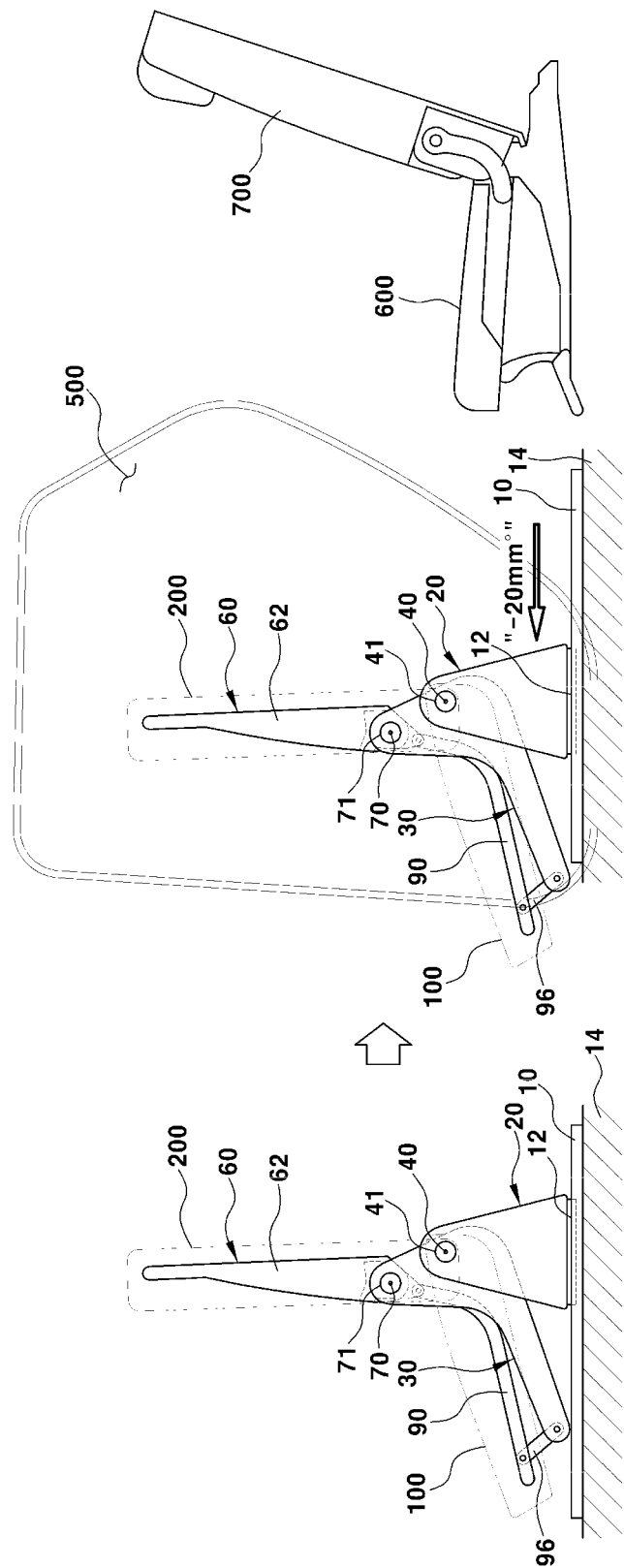

FIGS. 9A and 9B are side views illustrating an operation in which a walk-in mode of the seat for a vehicle according to the present invention is implemented.

The walk-in mode is a mode in which the front-row seat is moved forwards while vertically erecting the seatback of the front-row seat, considering that the front-row seat becomes an obstacle when a passenger intends to sit in a rear-row seat, so as to secure a wide passage for entry and exit of rear-row seat passengers.

For this, first, by the operation of the first motor 50, the seat cushion support frame 30 may be rotated at a predetermined angle in one direction (the direction toward the front of the vehicle) about the first hinge shaft 40 so as to allow the seat cushion 100 to be tilted downwards and forwards, and at the same time to allow the seatback frame 60 and the seatback 200 to be vertically erected, as illustrated in FIG. 9A.

For example, through control of current by the controller 300, the first motor 50 may be operated by the amount of rotation whereby the seat cushion support frame 30 is rotated at an angle of about −24° in one direction (the direction toward the front of the vehicle) about the first hinge shaft 40.

Next, the moving rail 12 may be moved forwards along the fixed rail 10.

Here, since the support bracket 20, to which a corresponding one of the opposite ends of the first hinge shaft 40 is connected, is mounted to the moving rail 12, the support bracket 20 may also be moved forwards together with the moving rail 12.

As the support bracket 20 moves forwards, the entire seat including the seat cushion 100 and the seatback 200 may be moved a predetermined distance forwards, and thus the walk-in mode, in which a wide passage for entry and exit is secured between a door opening 500 of the vehicle and the rear-row seat, may be easily implemented.

Rear-View Mode

Figure 10B:
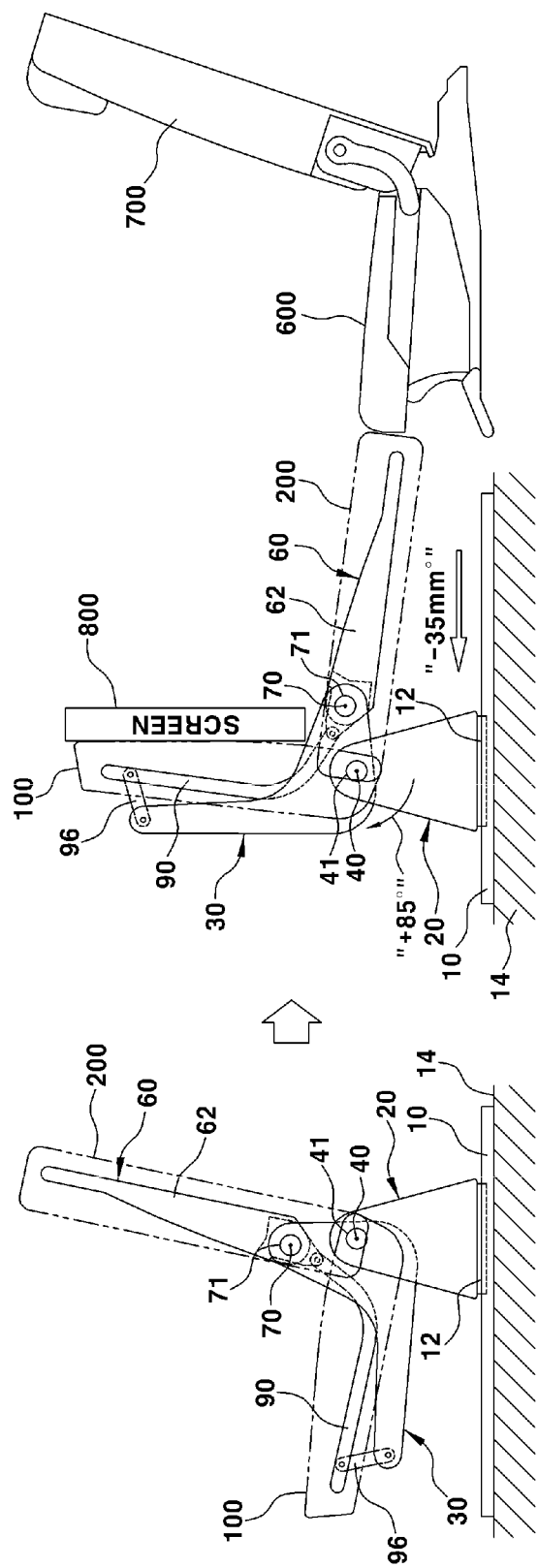

FIGS. 10A and 10B are side views illustrating an operation in which a rear-view mode of the seat for a vehicle according to the present invention is implemented.

The rear-view mode is a mode in which the front-row seat, arranged to face the front, is reversed to a rear-facing position.

For this, first, the second motor 80 may be operated to rotate the seatback frame 60 in one direction (the direction toward the front of the vehicle) by a predetermined angle about the second hinge shaft 70 so as to allow the seatback 200 to be rotated slightly forwards as illustrated in FIG. 10A. The reason why the seatback 200 is rotated slightly forwards is to align the seatback 200 in a line with the seat cushion of the rear-row seat.

For example, through control of current by the controller 300, the second motor 80 may be operated by the rotation amount at which the seatback 200 is rotated slightly forwards, thereby allowing the seatback 200 to be rotated about −10° from the default position.

Thereafter, by the operation of the first motor 50, the seat cushion support frame 30 may be rotated at a predetermined angle in the other direction (the direction toward the rear of the vehicle) about the first hinge shaft 40 so as to be vertically erected.

For example, through control of current by the controller 300, the first motor 50 may be operated by the amount of rotation whereby the seat cushion support frame 30 is rotated at an angle of about +85° in the other direction (the direction toward the rear of the vehicle) about the first hinge shaft 40.

As such, the seat cushion support frame 30 may rotate by a predetermined angle (about +85°) in the other direction (the direction toward the rear of the vehicle) about the first hinge shaft 40, allowing the seat cushion 100 to be vertically erected, and at the same time, allowing the seatback 200 to be aligned in a line with a seat cushion 600 of the rear-row seat, and thus, as illustrated in FIG. 10B, the rear-view mode, in which the seat cushion 100 faces a seatback 700 of the rear-row seat, may be implemented.

In the rear-view mode, a passenger can rest comfortably by putting his or her legs on the seatback 200 while seated on the rear-row seat, and can watch a movie or the like by attaching a screen 800 to the seat cushion 100.

As is apparent from the above description, the present invention provides the following effects.

First, a seat position can be variously adjusted into a full-flat mode, a relaxation mode, a cushion tip-up mode, a full-bed mode, a walk-in mode, a rear-view mode, or the like by using a first hinge shaft to rotate the entire seat and a second hinge shaft to rotate a seatback.

Second, compared to existing complicated mechanism for adjusting the seat position, the present invention allows six or more seat position adjustments to be made very efficiently and allows indoor space to be utilized to the maximum with a simple mechanism using only first and second hinge shafts, a support bracket, a seat cushion support frame, and an interlocking frame configured to rotatably support the first and second hinge shafts.

Although the present invention has been described in detail with reference to various embodiments, the scope of the present invention is not limited to the above-described embodiments, and various modifications and improvements by those skilled in the art using the basic concept of the present invention as defined in the claims below will also be included in the scope of the present invention.

What is claimed is:

1. A seat for a vehicle, the seat comprising:
    a pair of support brackets mounted on a floor panel so as to be movable forwards and rearwards;
    seat cushion support frames, each connected to a corresponding one of the pair of support brackets so as to be rotatable forwards and rearwards, and positioned at a predetermined height from the floor panel;
    a first hinge shaft passing through rear end portions of the seat cushion support frames, and having opposite ends thereof connected to upper portions of the pair of support brackets;
    a first motor mounted on one of the seat cushion support frames so as to rotate the seat cushion support frames using an operating force for rotation about the first hinge shaft;
    a second hinge shaft, passing through side plates of a seatback frame and having ends each connected to an upper rear end of a corresponding one of the seat cushion support frames;
    a second motor mounted on one of the side plate of the seatback frame so as to rotate the seatback frame using an operating force for rotation about the second hinge shaft; and
    an interlocking frame having rear ends hinge-coupled to lower ends of the side plates of the seatback frame and front ends hinge-coupled to front ends of the seat cushion support frames,
    a controller configured to control an amount of rotation of each of the first motor and the second motor,
    wherein the controller is mounted on a lower plate, the lower plate being mounted on a connection pipe that connects the rear ends of the seat cushion support frames to each other.

2. The seat of claim 1, wherein a pair of support links are provided to hinge-couple the front ends of the interlocking frame to the front ends of the seat cushion support frames, respectively.

3. The seat of claim 1, wherein the first motor is fixedly mounted on an inner surface of one of the seat cushion support frame by a connecting bar, and a gearbox portion of the first motor is connected to the first hinge shaft so as to be rotatable about the first hinge shaft.

4. The seat of claim 1, wherein the second motor is fixedly mounted on an inner surface of the seatback frame by a connecting bar, and a gearbox portion of the second motor is connected to the second hinge shaft so as to be rotatable about the second hinge shaft.

5. The seat of claim 1, wherein first bearings, configured to rotatably support the seat cushion support frames, are each mounted at the rear ends of the seat cushion support frames through which the first hinge shaft passes, and first support cores, to which both ends of the first hinge shaft are fixedly connected, are mounted on the pair of support brackets.

6. The seat of claim 1, wherein second bearings, configured to rotatably support the seatback frame, are each mounted at portions of the side plates of the seatback frame through which the second hinge shaft passes, and second support cores, to which both ends of the second hinge shaft are fixedly connected, are mounted on the seat cushion support frames.

7. The seat of claim 1, wherein a lower end of each of the support brackets is mounted on a moving rail, and a fixed rail, to which the moving rail is movably coupled, is mounted on the floor panel.

8. The seat of claim 1, wherein, as a height of a mounting point of in the rear end portion of the seat cushion support frame, which is the mounting point through which the opposite ends of the first hinge shaft pass, is lowered, a position at which the seat cushion support frames are vertically erected is adjusted to be moved further rearwards.

9. The seat of claim 1, wherein the seatback frame is rotated in one direction about the second hinge shaft by operation of the second motor so as to be folded onto the seat cushion, after which the seat cushion support frames are rotated at a predetermined angle in the one direction about the first hinge shaft by operation of the first motor so as to be tilted downwards and forwards, thereby implementing a full-flat mode in which a rear surface of a seatback is flush with a luggage board.

10. The seat of claim 1, wherein the seatback frame is rotated in a first direction at a predetermined angle about the second hinge shaft by an operation of the second motor so as to be reclined, after which the seat cushion support frame is rotated at a predetermined angle in the first direction about the first hinge shaft by operation of the first motor such that the front ends of the seat cushion support frame are tilted upward, thereby implementing a relaxation mode.

11. The seat of claim 1, wherein the seatback frame is rotated in one direction about the second hinge shaft by operation of the second motor so as to be folded onto the seat cushion, after which the seat cushion support frame is rotated at a predetermined angle in a different direction about the first hinge shaft by operation of the first motor so as to be vertically erected, thereby implementing a cushion tip-up mode in which the seat cushion is vertically erected together with a seatback.

12. The seat of claim 1, wherein the seatback frame is rotated in a different direction about the second hinge shaft by an operation of the second motor so as to be maximally reclined, after which a rear end portion of the interlocking frame and a rear end portion of the seat cushion rise at the same time, and after that, the seat cushion support frames are rotated at a predetermined angle in the different direction about the first hinge shaft by an operation of the first motor so as to be tilted upwards and forwards, thereby implementing a full-bed mode in which a seatback and a seat cushion are arranged to be flat and parallel to the floor panel.

13. The seat of claim 1, wherein the seat cushion support frames are rotated at a predetermined angle in one direction about the first hinge shaft so as to be tilted downwards and forwards, and the seatback frame is vertically erected by an operation of the first motor at the same time, after which a moving rail coupled to the support bracket is moved forwards along a fixed rail, thereby implementing a walk-in mode in which a passage for entry and exit is secured between a car door and a rear-row seat.

14. The seat of claim 1, wherein the seat cushion support frame rotate at a predetermined angle in a different direction about the first hinge shaft so as to be vertically erected, and a seatback is aligned with a seat cushion of a rear-row seat in a line at the same time, thereby implementing a rear-view mode in which a seat cushion faces a seatback of the rear-row seat.

15. The seat of claim 3, wherein a ring gear, which is a final output gear connected to a motor output shaft, is installed in the gearbox portion of the first motor.

16. The seat of claim 15, a pinion gear is mounted on the first hinge shaft coupled to the gear box portion of the first motor.

17. The seat of claim 1, the second hinge shaft connects the side plates of the seatback frame.

18. A vehicle comprising the seat of claim 1.

19. A seat for a vehicle, the seat comprising:
a pair of support brackets mounted on a floor panel so as to be movable forwards and rearwards;
seat cushion support frames, each connected to a corresponding one of the pair of support brackets so as to be rotatable forwards and rearwards, and positioned at a predetermined height from the floor panel;
a first hinge shaft passing through rear end portions of the seat cushion support frames, and having opposite ends thereof connected to upper portions of the pair of support brackets;
a first motor mounted on one of the seat cushion support frames so as to rotate the seat cushion support frames using an operating force for rotation about the first hinge shaft;
a second hinge shaft, passing through side plates of a seatback frame and having ends each connected to an upper rear end of a corresponding one of the seat cushion support frames;
a second motor mounted on one of the side plate of the seatback frame so as to rotate the seatback frame using an operating force for rotation about the second hinge shaft; and
an interlocking frame having rear ends hinge-coupled to lower ends of the side plates of the seatback frame and front ends hinge-coupled to front ends of the seat cushion support frames,
wherein the seat cushion support frame rotate at a predetermined angle in a different direction about the first hinge shaft so as to be vertically erected, and a seatback is aligned with a seat cushion of a rear-row seat in a line at the same time, thereby implementing a rear-view mode in which a seat cushion faces a seatback of the rear-row seat.

20. The seat of claim 19, wherein the seatback frame is rotated in one direction about the second hinge shaft by operation of the second motor so as to be folded onto the seat cushion, after which the seat cushion support frames are rotated at a predetermined angle in the one direction about the first hinge shaft by operation of the first motor so as to be tilted downwards and forwards, thereby implementing a full-flat mode in which a rear surface of a seatback is flush with a luggage board.

21. The seat of claim 19, wherein the seatback frame is rotated in a different direction about the second hinge shaft by an operation of the second motor so as to be maximally reclined, after which a rear end portion of the interlocking frame and a rear end portion of the seat cushion rise at the same time, and after that, the seat cushion support frames are rotated at a predetermined angle in the different direction about the first hinge shaft by an operation of the first motor so as to be tilted upwards and forwards, thereby implementing a full-bed mode in which a seatback and a seat cushion are arranged to be flat and parallel to the floor panel.

22. A seat for a vehicle, the seat comprising:
a pair of support brackets mounted on a floor panel so as to be movable forwards and rearwards;
seat cushion support frames, each connected to a corresponding one of the pair of support brackets so as to be rotatable forwards and rearwards, and positioned at a predetermined height from the floor panel;
a first hinge shaft passing through rear end portions of the seat cushion support frames, and having opposite ends thereof connected to upper portions of the pair of support brackets;
a first motor mounted on one of the seat cushion support frames so as to rotate the seat cushion support frames using an operating force for rotation about the first hinge shaft;
a second hinge shaft, passing through side plates of a seatback frame and having ends each connected to an upper rear end of a corresponding one of the seat cushion support frames;
a second motor mounted on one of the side plate of the seatback frame so as to rotate the seatback frame using an operating force for rotation about the second hinge shaft; and
an interlocking frame having rear ends hinge-coupled to lower ends of the side plates of the seatback frame and front ends hinge-coupled to front ends of the seat cushion support frames,
wherein a rear end portion of the interlocking frame may be hinge-coupled by a hinge shaft to the lower end portion of the side plate of the seatback frame, the hinge shaft is positioned at a lower height than the second hinge shaft.

* * * * *